United States Patent [19]
Abbate et al.

[11] 3,719,680
[45] March 6, 1973

[54] NOVEL N-(PIPERAZINYLETHYL)-CARBAMATES

[75] Inventors: Franklin W. Abbate, North Haven; William J. Farrissey, Jr., Northford, both of Conn.

[73] Assignee: The Upjohn Company, Kalamazoo, Mich.

[22] Filed: March 2, 1970

[21] Appl. No.: 15,925

[52] U.S. Cl. ......260/268 R, 260/268 T, 260/268 PH, 260/468 C, 260/471 R, 260/482 C, 260/579, 260/655 R, 260/864
[51] Int. Cl. ............................................C07d 51/70
[58] Field of Search ....................260/268 R, 243 AA

[56] References Cited

UNITED STATES PATENTS 3,138,597   6/1964   Schut ............................260/268 PA

*Primary Examiner*—Donald G. Daus
*Attorney*—Steward & Steward, Merrill F. Steward, Donald T. Steward, Walter D. Hunter and John Kekich

[57] ABSTRACT

N-(piperazinylethyl)-carbamates are prepared in good yield by reacting at an elevated temperature an N-hydrocarbylcarbamate with triethylenediamine or an N-hydrocarbylcarbamate, triethylenediamine and an added alkylating agent. The N-piperazinyl derivatives so-formed are useful as catalysts in the manufacture of polyurethanes, in the preparation of acid-soluble and acid-dyeable polyurethanes.

4 Claims, No Drawings

NOVEL N-(PIPERAZINYLETHYL)-CARBAMATES

BACKGROUND OF THE INVENTION

1. Field of the Invention

This invention relates to novel N-(piperazinylethyl)-carbamates and to a method for their preparation and relates particularly to N-(piperazinylethyl)-carbamates synthesized by reacting at an elevated temperature an N-hydrocarbylcarbamate with triethylenediamine or an N-hydrocarbylcarbamate, triethylenediamine and an added alkylating agent.

2. Description of the Prior Art

The only work previously described in the art in which triethylenediamine has been employed as a reactant to give a piperazine derivative is that of Ross et al, JACS 85, 3999 (1963) who reacted 2,4-dinitrochlorobenzene with triethylenediamine to form the compound:

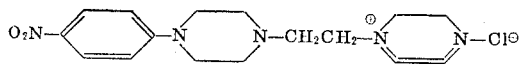

SUMMARY OF THE INVENTION

The present invention comprises novel compounds of the formula:

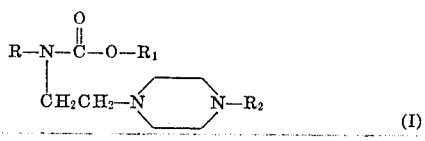

wherein R is hydrocarbyl of one to 12 carbon atoms, wherein $R_1$ and $R_2$ are selected from the group consisting of $CH_3$, straight chain lower alkyl; $CH_2CH_2R_3$, wherein $R_3$ is selected from the group consisting of $CH_3O$, straight chain lower alkoxy and aryloxy of not more than 12 carbon atoms and with the proviso that when $R_2$ is $CH_2CH_2R_3$ then $R_1$ is the same substituent group, and to a process for preparing such novel compounds.

The novel piperazine derivatives of this invention can be utilized as catalysts in preparing valuable polyurethane products, in the preparation of acid-dyeable modified polyesters and for the modification of polyurethanes prepared from a polyester polyol and a polyisocyanate to yield acid-dyeable or acid-soluble polymers.

Throughout this specification the term "hydrocarbyl of from one to 12 carbon atoms" means the monovalent radical resulting when one hydrogen atom is removed from the parent hydrocarbon having the requisite number of carbon atoms. Illustrative of such groups are (a) alkyl, such as methyl, ethyl, propyl, butyl, pentyl, hexyl, heptyl, octyl, nonyl, decyl, undecyl, dodecyl; (b) alkenyl, such as vinyl, allyl, butenyl, pentenyl, hexenyl, octenyl, dodecenyl, etc.; (c) aralkyl, such as benzyl, phenylethyl, phenylpropyl, phenylhexyl, naphthylmethyl, etc.; (d) aryl, such as phenyl, tolyl, xylyl, naphthyl, bis-phenylyl, etc.; (e) alkaryl, such as ethylphenyl, isopropylphenyl, ethylxylyl, methylnaphthyl, etc.; (f) cycloalkyl, such as cyclobutyl, cyclohexyl, cyclooctyl, cyclodecyl, etc.; and (g) cycloalkenyl such as cyclobutenyl, cyclopentenyl, cyclohexenyl, cyclooctenyl, cyclododecenyl, etc., and isomeric forms of members of the above groups. The phrase straight chain "lower alkyl" in this specification means alkyl of from two to eight inclusive carbon atoms, as exemplified by ethyl, propyl, butyl, pentyl, hexyl, heptyl, octyl, and isomeric forms thereof. The phrase "straight chain lower alkoxy" as used herein means straight chain alkoxy of from two to eight inclusive carbon atoms including ethoxy, propoxy, butoxy pentyloxy, hexyloxy, heptyloxy and octyloxy. The term "aryloxy of not more than 12 carbon atoms" means aryloxy such as phenoxy, xyloxy, naphthoxy, ethylphenoxy, n-propylxyloxy, isobutylphenonoxy, etc.

A wide variety of catalysts are employed in the preparation of polyurethanes and especially in preparing polyurethane foams by the reaction of polyisocyanates with polyols in the presence of a fluorocarbon foaming agent. One of the most important of these catalysts is triethylenediamine which is employed in substantial quantities in the urethane industry in foam preparation as well as in the manufacture of other urethane products. It has been found that the novel N-(piperazinylethyl)-carbamates of this invention are valuable urethane catalysts which may be employed as a substitute for a part or all of the triethylenediamine commonly utilized in the production of polyurethanes by interaction of diisocyanates and polyols or in the production of polyureas by interaction of diisocyanates and polyamines. Methods for producing such polyurethanes and polyureas in the form of film, fibers and foams utilizing the conventionally employed diisocyanates and polyols together with the novel catalysts of this invention will be readily apparent to those skilled in the art. Conventional procedures for the synthesis of such polyurethanes are described by Saunders et al., *Polyurethanes, Chemistry and Technology*, Part II, Interscience Publishers, 1964, pp. 299–451.

Examples of art-recognized polyols which an be employed alone, or as mixtures, in preparing polyurethanes includes the following:

1. Aliphatic diols, such as ethylene glycol, 1,2-propylene glycol, 1,4-butanediol, 1,2-hexanediol, 1,5-pentanediol, 1,2-hexanediol, etc.;
2. aliphatic triols, such as trimethylolmethane, trimethylolethane, 1,2,3-hexanetriol, 1,1,1-trimethylolhexane, etc.;
3. aliphatic tetrols, such as erythritol, pentaerythritol, etc.;
4. aliphatic pentols, such as arabitol, xylitol, etc.;
5. aliphatic hexols, such as mannitol, sorbitol, dipentaerythritol, etc;
6. aniline-alkylene oxide diol adducts; and adducts prepared by reacting any of the above-named compounds (1) through (5) above with one or more molar proportions of ethylene oxide, propylene oxide, 1,2-butylene oxide, or mixtures thereof.

Any of the prior art polyisocyanates can be used as reactants in preparing polyurethane products when utilizing the novel products of this invention as catalysts e.g., diisocyanate, -tolylene diisocyanate, 2,6-tolylene diisocyanate, 4,4-diphenylmethane diisocyanate, dianisidine diisocyanate, tolidine diisocyanate, hexamethylene diisocyanate, m-xylene diisocyanate, 1,5naphthalene diisocyanate, and other di- and higher polyisocyanates such as those listed in the table of Siefken, Ann. 562, 122–135 (1949). Preferred polyisocyanates, however, are products obtained by phosgenation of mixtures of methylene-bridged polyphenyl polyamines obtained by the interaction of formaldehyde, hydrochloric acid, and primary aromatic amines, for example, aniline, o-chloroaniline, o-toluidine, or mixtures thereof. Such polyisocyanates are known in the art, e.g., U.S. Pat. Nos. 2,683,730; 2,950,263; and 3,012,008; Canadian Pat. No. 665,495; and German specification No. 1,131,877.

In preparing polyurethane products employing the novel N-(piperazinylethyl)-carbamates of this invention as catalysts, or as a part of the catlyst mixture, by reaction of any of the polyisocyanates conventionally employed in the art with the available polyols, blowing agents, surfactants, cell-openers and the like adjuvants commonly employed for the production of polyurethane products may be used. If desired, special polyols such as the phosphorus-containing polyols can be incorporated in the polyurethane reaction mixture in order to impart fire retardent properties to the resulting foam. Examples of such phosphorus-containing polyols are the tris polyropylene glycol phosphates produced by interaction of phosphoric and propylene oxide as, for example, described in U.S. Pat. Nos. 2,372,244 and 3,094,549.

DETAILED DESCRIPTION OF THE INVENTION

The novel N-(piperazinylethyl)-carbamates (I) of this invention are obtained by reacting at an elevated temperature (a) an N-hydrocarbylcarbamate with triethylenediamine or (b) an N-hydrocarbylcarbamate, triethylenediamine and an added alkylating agent.

In process (a), where the N-hydrocarbylcarbamate is reacted with triethylenediamine, the process and products thereof can be illustratively represented as follows:

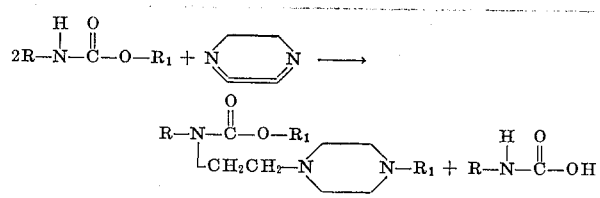

wherein $R_1$ has the same meaning as hereinbefore defined.

Process (b) where the N-hydrocarbylcarbamate, triethylenediamine and an added alkylating agent are reacted together can be illustratively represented as follows:

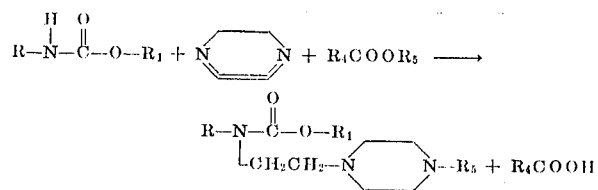

wherein $R_1$ has the same meaning as previously defined, $R_4$ is selected from the group consisting of $CH_3$, straight chain lower alkyl, $CH_3O$ and straight chain lower alkoxy, $R_5$ is selected from the group consisting of $CH_3$ and straight chain lower alkyl and with the proviso that when $R_4$ is $CH_3$ or straight chain lower alkyl then $R_5$ is $CH_3$ and when $R_4$ is $CH_3O$ or straight chain lower alkoxy, the alkyl group thereof has the same number of carbon atoms as $R_5$.

In conducting process (a) or (b) of this invention, the N-hydrocarbylcarbamate employed as a starting material is preferably reacted with triethylenediamine in the presence of an inert organic solvent. The inert organic solvent can be any organic solvent which is inert under the conditions of the reaction, e.g., does not enter into reaction with any of the reactants employed or in any way interfer with the progress of the reaction. Suitable inert organic solvents include benzene, toluene, xylene, naphthalene, decalin, chlorobenzene, o-dichlorobenzene, bromobenzene, etc.

Advantageously, processes (a) and (b) are conducted at a temperature ranging from about 80°C. to about 300°C. and preferably at a temperature within the range of about 125°C. to about 200°C. Approximately stoichiometric quantities of the reactants are generally employed in processes (a) and (b) although, if desired, an excess of the carbamate can be utilized. The progress of the conversion of the N-hydrocarbylcarbamate to the desired piperazine derivative can be followed by any of the appropriate analytical techniques such as infrared spectrographic analysis, etc. The desired N-(piperazinylethyl)-carbamate can be isolated from the reaction mixture of process (a) or (b) by conventional procedures in organic chemical operations such as by extraction, distillation, precipitation as the hydrochloric acid salt, etc.

The N-hydrocarbylcarbamates utilized as starting materials in process (a) and (b) are for the most part known compounds which can be prepared by methods conventional in the art for the preparation of N-substituted carbamates. A particularly convenient method involves the reaction of the appropriate chloroformate and appropriate hydrocarbylamine; see, for example, H. von Pechmann, Ber, 28, 855 (1895) for a description of the preparation of ethyl N-methylcarbamate from methylamine and ethyl chloroformate as representative of the conditions required in preparing this series of compounds. Another method for the preparation of N-substituted carbamates involves the reaction of the corresponding N-substituted carbamyl halide with the appropriate alcohol for example, using the procedure described by Gattermann, Annalen 244,30 (1888) for the reaction of carbamyl chloride itself with alcohols.

N-substituted carbamates can also be obtained by the alkylation of olefins with urethane (ethyl carbamate) as described by Mueller and Merten, Ber, 98, 1097 (1965) and by condensation of aldehydes with alkyl carbamates as described, for instance, by Bischoff, Ber, 7, 628(1874).

Various embodiments of this invention are illustrated in the following examples which are to be considered not limitative:

EXAMPLE I

Methyl N-phenyl-N-methylpiperazinylethylcarbamate

A total of 15.2 g. of methyl N-phenyl carbamate, 5.6 g. of triethylenediamine and 10 ml. of methyl carbonate were added with mixing at room temperature to 100 ml. of chlorobenzene. The mixture was heated over a period of about 15 minutes to refluxing temperature and the refluxing operation was continued over a period of about 5 hours.

Following dilution of the reaction mixture with ether, it was extracted with four portions of hydrochloric acid (5 percent by volume) and finally with water. In the next step the resulting aqueous acid layer was washed with two portions of ether. The organic layers were combined, washed with a saturated salt solution and finally dried over magnesium sulfate and after evaporation of the ether, residue containing the unreacted starting carbamate weighing 10.2 grams was obtained.

The acid aqueous layer was made basic through the addition of sodium hydroxide (10 percent by volume), saturated with sodium chloride and then extracted with five portions of ether. After the ether phase had been washed to neutrality with a saturated salt solution, it was dried over magnesium sulfate and on evaporation there was recovered 11.3 g. (82 percent of the theoretical yield) of the compound having the formula:

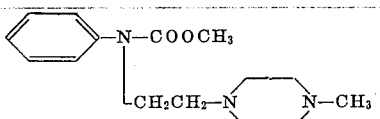

boiling point 156°–158°C. at 0.5 mm. Hg, which was identified by infrared spectrographic nuclear magnetic resonance analyses as well as by elemental analysis.

Analysis — Calc'd for $C_{15}H_{23}O_2N_3$: C,65.95; H,8.36; N,15.15. Found: C,65.14; H,8.42; N,15.22.

EXAMPLE II

Butyl N-phenyl-N-butylpiperazinylethylcarbamate

To 35 ml. of butyl carbonate there was added with mixing at room temperature 38.74 g. of butyl N-phenylcarbamate, and 22.48 g. of triethylenediamine after which the reaction mixture was heated with mixing for 20 hours at 150°C. In the next step, the resulting mixture was diluted with ether and then worked up into basic and neutral fractions utilizing the general procedure employed in Example 1.

From the basic phase there was recovered a total of 19.68 g. (50.8 percent of the theoretical yield) of the compound having the formula:

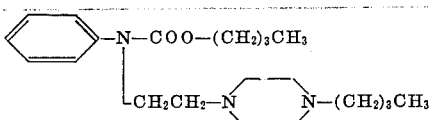

boiling point 185°–187°C. at 0.4 mm. Hg, which was identified by infrared spectrographic analysis as well as by elemental analysis.

Analysis—Calc'd. for $C_{21}H_{35}O_2N_3$: C,69.77; H,9.76; N,11.62. Found: C,69.39; H,9.70; N,11.81.

EXAMPLE III

Butyl N-phenyl-N-methylpiperazinylethylcarbamate

In this example 38.6 g. of butyl N-phenylcarbamate, 13.0 g. of methyl hexanoate, and 12.4 g. of triethylenediamine were heated with mixing at 150°C. for 24 hours. The reaction mixture was cooled, diluted with ether and water and then filtered. The resulting etheral portion was washed with 1 N hydrochloric acid until acidic while the combined aqueous phase was washed with ether, made basic with sodium hydroxide (10 percent by volume) and finally continuously extracted with ether. After the etheral phase had been dried over magnesium sulfate, there was obtained on evaporation of the ether approximately 10 g. of a basic mixture which on distillation yielded 5.5 g. (16 percent of the theoretical yield) of the compound of the formula:

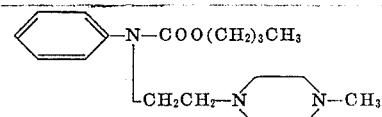

The above product was identified by infrared spectrographic and nuclear magnetic resonance analyses.

EXAMPLE IV

A total of 38.6 g. of butyl N-phenylcarbamate, 13.0 g. methyl hexanoate, and 12.4 g. of triethylenediamine were added with mixing to 20 ml. of butyl carbonate. The reaction mixture was heated at 150°C. with mixing for 4 hours. After the reaction mixture had cooled, it was diluted with ether and the etheral phase extracted with 1 N hydrochloric acid. Employing the general procedure of Example I there was recovered from the basic phase 10.1 g. (32 percent of the theoretical yield) of the compound of formula:

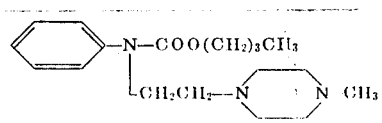

boiling point 180°–181°C. at 0.7 mm. Hg. The compound was further identified by infrared, nuclear magnetic resonance and vapor phase chromatography analyses.

Analysis — Calc'd. for $C_{18}H_{29}N_3O_2$: C,67.67; H,9.15; and N,13.16. Found: C,67.70; H,9.04; N,13.50.

EXAMPLE V

Using the procedure of Example I but replacing methyl N-phenylcarbamate with:
  hexyl N-methylphenylcarbamate
  ethyl N-vinylcarbamate,
  octyl N-pentenylcarbamate,
  ethyl N-naphthylcarbamate,
  butyl N-ethylxylylcarbamate,
  propyl N-cyclohexylcarbamate,
  methyl N-benzylcarbamate, or heptyl N-cyclobutenylcarbamate.
there are obtained in good yield:
- hexyl N-methylphenyl-N-methylpiperazinylethylcarbamate,
- ethyl N-vinyl-N-methyl piperazinylethylcarbamate,
- octyl N-pentenyl-N-methylpiperazinylethylcarbamate,
- ethyl N-naphthyl-N-methylpiperazinylethylcarbamate,
- butyl N-ethylxylyl-N-methylpiperazinylethylcarbamate,
- propyl N-cyclohexyl-N-methylpiperazinylethylcarbamate,
- methyl N-benzyl-N-methylpiperazinylethylcarbamate, and
- heptyl N-cyclobutenyl-N-methylpiperazinylethylcarbamate, respectively.

EXAMPLE VI

A total of 7.8 g. of methyl N-phenylcarbamate and 3.0 g. of triethylenediamine were refluxed in 100 ml. of chlorobenzene for 6 hours. After the reaction mixture had been filtered, it was worked up into basic and neutral fractions using the general procedure of Example I. The basic fraction gave in excess of 50 percent of the theoretical yield of a product which was shown to be identical to the compound obtained in Example I (i.e., methyl N-phenyl-N-methylpiperazinylethyl carbamate) by infrared spectrographic and vapor phase chromatographic analyses.

EXAMPLE VII

Using the procedure of Example VI but replacing methyl N-phenylcarbamate with phenoxyethyl N-phenylcarbamate there was obtained in good yield phenoxyethyl N-phenyl-N-phenoxyethylpiperazinylethylcarbamate.

EXAMPLE VIII

Employing the procedure of Example I but substituting ethyl carbonate, n-propyl carbonate and hexyl carbonate for methyl carbonate there are obtained in comparable yield:
- methyl-N-phenyl-N-ethylpiperazinylethylcarbamate,
- methyl-N-phenyl-N-n propylpiperazinylethylcarbamate, and
- methyl-N-phenyl-N-hexylpiperazinylethylcarbamate, respectively.

Highly useful polyurethane foams can be prepared in which the novel N-(piperazinylethyl)-carbamates of this invention are employed as catalysts. The preparation of a typical foam product is set forth in the following preparation:

Using a mechanical blender, 100 parts by weight of polyol of equivalent weight 133 which is a blend of (i) an adduct of propylene oxide and a methylene bridged polyphenyl polyamine mixture obtained by acid condensation of aniline and formaldehyde and (ii) a glycerol-propylene oxide adduct, 2 parts by weight of a water-soluble silicone-glycol copolymer cell control agent and foam stabilizer, and 3.2 parts by weight methyl N-phenyl-N-methylpiperazinylethylcarbamate are mixed together after which 32 parts by weight of a blowing agent, which is stabilized trichlorofluoromethane, is added. To the resulting mixture is added, as rapidly as possible, 112 parts by weight of polymethylene polyphenyl isocyanate of equivalent weight 113 (PAPI). The mixture thus-obtained is stirred with a high speed stirrer for approximately 30 seconds and then is poured into an open mold (7 ×7 ×12 inches). The resulting foam, which is allowed to rise freely, is cured at room temperature (about 20° to 25°C. for 7 days and afterwards subjected to physical testing. A polyurethane foam suitable for a wide variety of commercial applications, such as in the preparation of packaging containers, structural panels, etc. is obtained.

What is claimed is:

1. A compound of the formula:

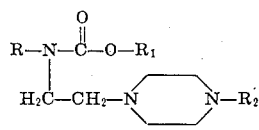

wherein R is a member of the group consisting of phenyl, tolyl, xylyl and naphthyl; and $R_1$ and $R_2$ are selected from the group consisting of straight chain lower alkyl of not more than four carbons.

2. The compound of claim 1 wherein R is phenyl, $R_1$ is $CH_3$ and $R_2$ is $CH_3$.

3. The compound of claim 1 wherein R is phenyl and $R_1$ and $R_2$ each are $CH_3(CH_2)_3$.

4. The compound of claim 1 wherein R is phenyl, $R_1$ is $CH_3(CH_2)_3$ and $R_2$ is $CH_3$.

* * * * *

UNITED STATES PATENT OFFICE
CERTIFICATE OF CORRECTION

Patent No. 3,719,680     Dated March 6, 1973

Inventor(s) Franklin W. Abbate and William J. Farrissey, Jr.

It is certified that error appears in the above-identified patent and that said Letters Patent are hereby corrected as shown below:

Title Page:

The References Cited should include:

3,131,213    4/64    Surrey . . . . . . . . . . 260/268R 2,914,528    11/59    Craig. . . . . . . . . . . 260/268R Signed and sealed this 10th day of July 1973.

(SEAL)
Attest:

EDWARD M. FLETCHER, JR.  
Attesting Officer

Rene Tegtmeyer  
Acting Commissioner of Patents